(12) United States Patent
Hennessy et al.

(10) Patent No.: US 10,137,917 B2
(45) Date of Patent: Nov. 27, 2018

(54) SHOPPING CART ITEM SECURING DEVICE

(71) Applicants: Patricia Hennessy, Dublin, NH (US); Dana Hennessy, Dublin, NH (US); Maurice Glaude, Francestown, NH (US); Carrie Glaude, Francestown, NH (US)

(72) Inventors: Patricia Hennessy, Dublin, NH (US); Dana Hennessy, Dublin, NH (US); Maurice Glaude, Francestown, NH (US); Carrie Glaude, Francestown, NH (US)

( * ) Notice: Subject to any disclaimer, the term of this patent is extended or adjusted under 35 U.S.C. 154(b) by 0 days.

(21) Appl. No.: 15/588,038

(22) Filed: May 5, 2017

(65) Prior Publication Data

US 2017/0320511 A1 Nov. 9, 2017

Related U.S. Application Data

(60) Provisional application No. 62/332,498, filed on May 6, 2016.

(51) Int. Cl.
*B62B 3/04* (2006.01)
*B62B 5/06* (2006.01)

(52) U.S. Cl.
CPC . *B62B 3/04* (2013.01); *B62B 5/06* (2013.01)

(58) Field of Classification Search
CPC ....... B62B 3/04; B62B 3/1408; B62B 3/1472; B62B 3/1412; B62B 3/146; B62B 3/1424; B62B 3/1428; B62B 3/1416; B62B 3/142; B62B 3/1468; Y10T 403/7105; F16L 3/1075; B63B 3/1416; B63B 3/142; B63B 3/1468
USPC ................ 248/540, 229.13, 229.1, 49–74.5; 280/33.992; 224/926, 411; 403/385; 24/485, 487
See application file for complete search history.

(56) References Cited

U.S. PATENT DOCUMENTS

| 4,443,128 A * | 4/1984 | Yamamoto | F16B 7/04 403/385 |
| 5,230,489 A * | 7/1993 | White | F16L 3/233 24/16 PB |
| 9,345,353 B2 * | 5/2016 | Forbes | G09F 21/04 |

* cited by examiner

*Primary Examiner* — Christopher Garft
(74) *Attorney, Agent, or Firm* — Dunlap Bennett & Ludwig PLLC

(57) ABSTRACT

A shopping cart attachment. The shopping cart attachment includes an attachment brace and an accessory clasp. The accessory clasp attaches the shopping cart attachment to a shopping cart. The attachment brace releasably secures a hand bag within.

1 Claim, 3 Drawing Sheets

SHOPPING CART ITEM SECURING DEVICE

CROSS-REFERENCE TO RELATED APPLICATION

This application claims the benefit of priority of U.S. provisional application No. 62/332,498, filed May 6, 2016, the contents of which are herein incorporated by reference.

BACKGROUND OF THE INVENTION

The present invention relates generally to shopping cart accessories. More particularly the present invention relates to a device configured to secure a purse or bag handle to the shopping cart.

SUMMARY OF THE INVENTION

In one aspect of the present invention, a shopping cart attachment comprises: an attachment brace comprising a first member and a second member attached together by a first hinge on a first side and releasably attached together by a connector at a second side, wherein a circular opening sized to tightly fit around a handle bar of a shopping cart is formed in between the first member and the second member; and an accessory clasp comprising a lower member extending from a top of the attachment brace and an upper member, wherein the upper member and the lower member are attached together by a second hinge at a first side and releasably attached together by a latch at a second side, wherein an accessory opening is formed in between the lower member and the upper member.

In another aspect of the present invention, a shopping cart attachment comprises: an attachment brace comprising a first member and a second member attached together by a first connector at a first side and a second connector at a second side, wherein a circular opening sized to tightly fit around a handle bar of a shopping cart is formed in between the first member and the second member; a support arm laterally extending from the attachment brace; and an accessory clasp comprising a lower member extending from a top of the attachment brace and an upper member, wherein the upper member and the lower member are attached together by a hinge at a first side and releasably attached together by a latch at a second side, wherein an accessory opening is formed in between the lower member and the upper member.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Generally, the present invention concerns a device for securing items to a shopping cart. The device can be attached to a shopping cart on one end, and to an item to be secured at the other end. The device may comprise: a trip mechanism to automatically close the device over the item to be secured; a push button to open the device; a band or other structure to clasp to the shopping cart-such as at a handlebar; and a screw or other connection device to tighten the band around the cart's handlebar.

Figure 1:
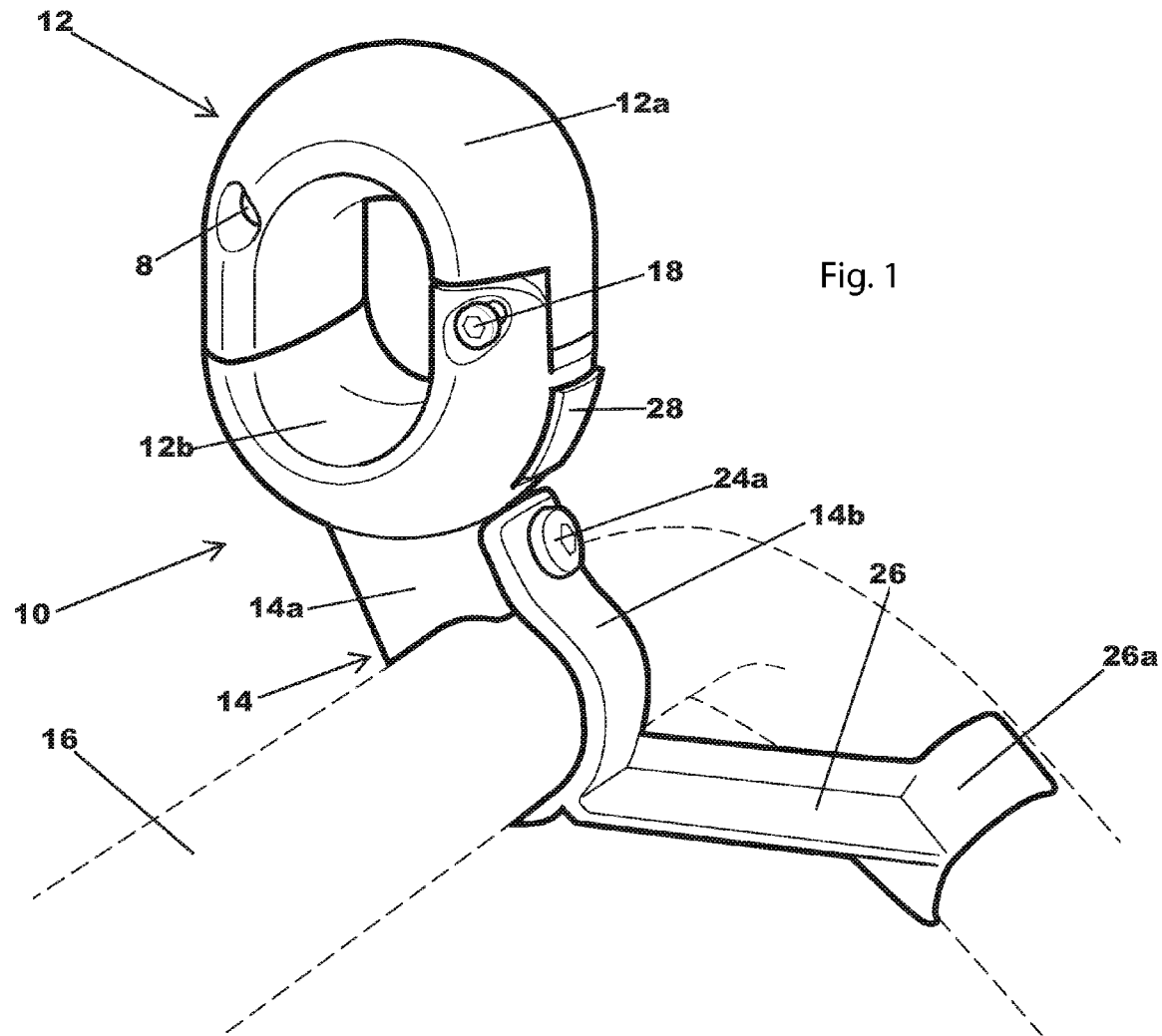
FIG. 1 is a perspective view of an embodiment of the present invention shown in use in a closed configuration.
Figure 2:
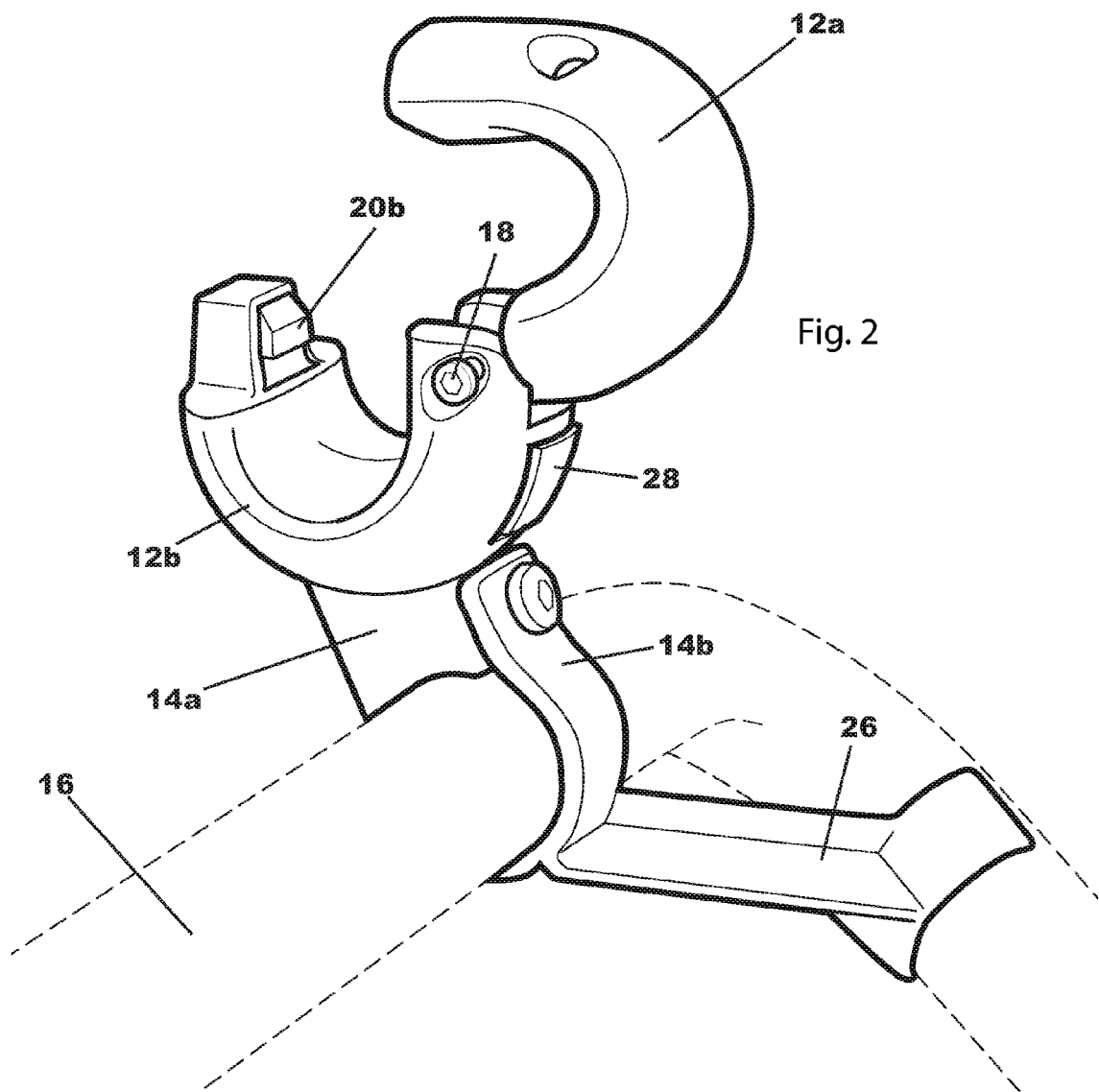
FIG. 2 is a perspective view of an embodiment of the present invention shown in use in an open configuration.
Figure 3:
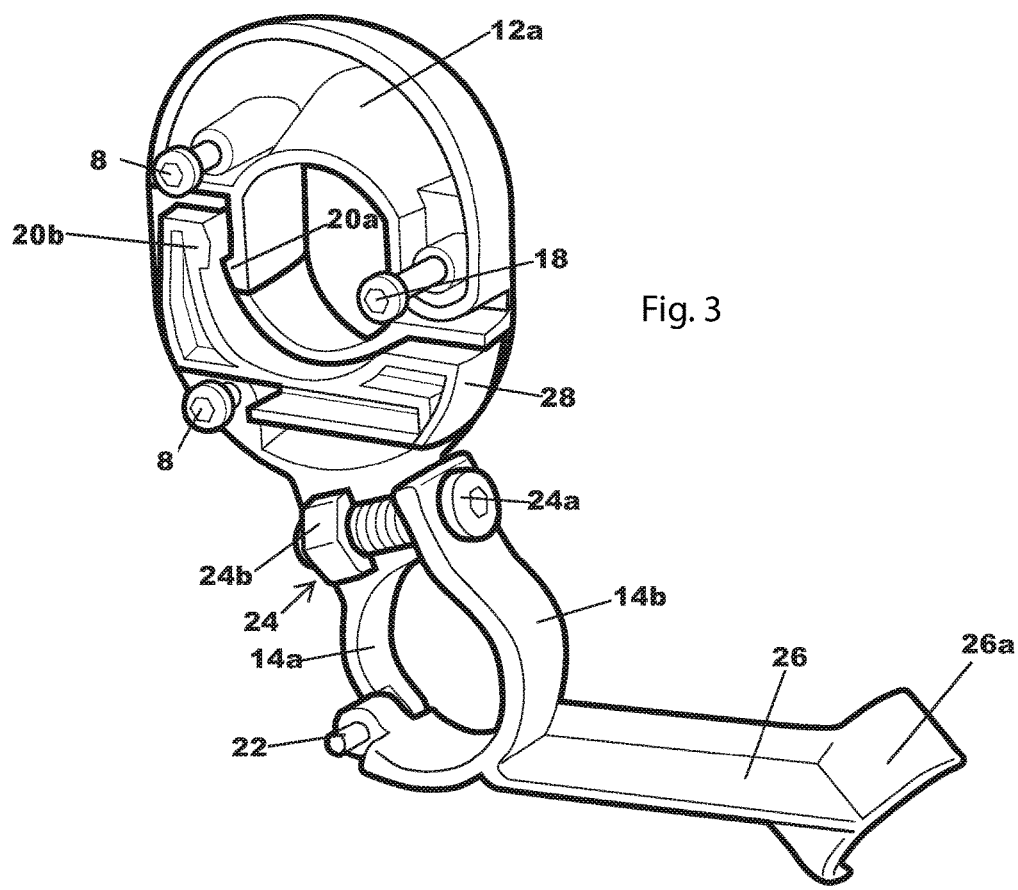
FIG. 3 is a cross sectional view of an embodiment of the present invention.

Referring to FIGS. 1 through 3, the present invention includes a shopping cart attachment 10. The shopping cart attachment 10 includes an attachment brace 14 and an accessory clasp 12. The attachment brace 14 includes a first member 14a and a second member 14b. The first member 14a and the second member 14b are attached together by a first connector at a first side and a second connector at a second side. The accessory clasp 12 includes a lower member 12b extending from a top of the attachment brace 14 and an upper member 12a. The upper member 12a and the lower member 12b are attached together by a hinge 18 at a first side and releasably attached together by a latch 20 at a second side. An accessory opening is formed in between the lower member 12b and the upper member 12a.

The attachment brace 14 is used to secure the shopping cart attachment 10 to a handle bar 16 of the shopping cart. A circular opening sized to tightly fit around the handle bar 16 of the shopping cart is formed in between the first member 14a and the second member 14b. A hinge 22 may connect the first member 14a to the second member 14b at the first side. The second connector 24 may include any connector that releasably secures the first member 14a and the second member 14b at the second side. For example, the connector 24 may include a female threaded portion disposed within the first member 14a, an aligned opening formed in the second member 14b and a threaded bolt 24a running through the aligned opening and mechanically fastened to the female threaded portion. A nut 24b may include the female threaded portion. The bolt 24a screws into the nut 24b, releasably attaching the attachment brace 14 to the handle bar 16.

The present invention may further include a support arm 26. The support arm 26 laterally extends from the attachment brace 14. A distal end of the support arm 26 abuts a portion of the handlebar 16, thereby stabilizing the attachment brace 14 to the handlebar 16. In certain embodiments, the distal end of the support arm 26 includes a C-shaped head 26a. The C-shaped head 26a forms an opening perpendicular to the circular opening. The C-shaped head 26a conforms to a portion of the handlebar 16.

In certain embodiments, the accessory clasp 12 includes a push button 28 used to operate the latch 20. Engaging the push button 28 unlocks the latch 20 and thereby disengages the upper member 12a from the lower member 12b at the first side. The latch 20 may include a stationary jaw member 20a secured to the upper member 12a and a sliding jaw member 20b secured to the lower member 12b. The sliding jaw member 20b is spring biased to engage the stationary jaw member 20b and thereby keep the accessory clasp 12 closed. A user may apply pressure to the push button 28 which laterally slides the sliding jaw member 20b away from the stationary jaw member 20a and thereby disengages the upper member 12a from the lower member 12b at the first side. In certain embodiments, the stationary jaw member 20a is recessed within the upper member 12a and the sliding jaw member 20b is protruding from the lower member 12b. A bolt 8 may secure the latch 20 within the accessory clasp 12.

A method of using the present invention may include the following. A user may first separate the first member 14a and the second member 14b of the attachment brace 14. In certain embodiments, separating the first member 14a from the second member 14b includes unscrewing the threaded bolt 24a from the nut 24b and pivoting the first member 14a away from the second member 14b about the hinge 22. The user may then close the first member 14a and the second member 14b around the handlebar 16 of the shopping cart, reinsert the bolt 24a and tighten the bolt 24a to the nut 24b, thereby tightening the attachment brace 14 to the handlebar 16. The C-shaped head 26a of the support arm 26 abuts against a portion of the handle bar 16. The user may then press the push button 28, disengaging the sliding jaw member 20b from the stationary jaw member 20a. The user may pivot the upper member 12a away from the lower member 12b, opening the accessory clasp 12. The user may then place their purse handle or other bag handle within the accessory opening and pivot the upper member 12a back towards the lower member 12b. The stationary jaw member 20a may snap onto the sliding jaw member 20b, locking the upper member 12a to the lower member 12b. The purse or other bag is now releasably secured to the shopping cart while the user is shopping.

It should be understood, of course, that the foregoing relates to exemplary embodiments of the invention and that modifications may be made without departing from the spirit and scope of the invention as set forth in the following claims.

What is claimed is:

1. A shopping cart attachment comprising:

an attachment brace comprising a first member and a second member attached together by a first connector at a first side and a second connector at a second side, wherein a circular opening sized to tightly fit around a handle bar of a shopping cart is defined in between the first member and the second member;

a support arm laterally extending from the second member of the attachment brace at an angle, the support arm comprising a distal end comprising a C-shaped head comprising terminal ends and defining an opening perpendicular to the circular opening; and an accessory clasp comprising a lower member extending from the first member of the attachment brace and an upper member, wherein the upper member and the lower member are attached together by a hinge at a first side and releasably attached together by a latch at a second side, wherein an accessory opening is formed in between the lower member and the upper member.

* * * * *